United States Patent
Cura et al.

(10) Patent No.: US 11,377,576 B2
(45) Date of Patent: Jul. 5, 2022

(54) STRUCTURAL ADHESIVE WITH IMPROVED CORROSION RESISTANCE

(71) Applicant: 3M INNOVATIVE PROPERTIES COMPANY, St. Paul, MN (US)

(72) Inventors: Elisabeth Cura, Dusseldorf (DE); Sohaib Elgimiabi, Dusseldorf (DE)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 344 days.

(21) Appl. No.: 15/775,190

(22) PCT Filed: Nov. 14, 2016

(86) PCT No.: PCT/US2016/061761
§ 371 (c)(1),
(2) Date: May 10, 2018

(87) PCT Pub. No.: WO2017/087295
PCT Pub. Date: May 26, 2017

(65) Prior Publication Data
US 2018/0282592 A1   Oct. 4, 2018

(30) Foreign Application Priority Data
Nov. 19, 2015 (EP) .................... 15195394

(51) Int. Cl.
| | |
|---|---|
| C09J 11/04 | (2006.01) |
| C09J 163/00 | (2006.01) |
| C08L 63/00 | (2006.01) |
| C08L 71/00 | (2006.01) |
| C08G 59/22 | (2006.01) |
| C08K 3/22 | (2006.01) |
| C08G 59/36 | (2006.01) |
| C08G 59/24 | (2006.01) |
| C09J 7/10 | (2018.01) |
| C09J 9/00 | (2006.01) |
| C09J 11/08 | (2006.01) |

(52) U.S. Cl.
CPC ............ *C09J 11/04* (2013.01); *C08G 59/223* (2013.01); *C08G 59/24* (2013.01); *C08G 59/36* (2013.01); *C08K 3/22* (2013.01); *C08L 63/00* (2013.01); *C08L 71/00* (2013.01); *C09J 7/10* (2018.01); *C09J 9/00* (2013.01); *C09J 11/08* (2013.01); *C09J 163/00* (2013.01); C08G 2650/56 (2013.01); *C09J 2301/312* (2020.08); *C09J 2451/00* (2013.01); *C09J 2463/00* (2013.01); *C09J 2471/00* (2013.01)

(58) Field of Classification Search
CPC ....................................................... C09J 11/04
See application file for complete search history.

(56) References Cited

U.S. PATENT DOCUMENTS

| 4,846,905 | A | * | 7/1989 | Tarbutton ............... C08G 59/62 525/65 |
|---|---|---|---|---|
| 6,000,118 | A | | 12/1999 | Biernat et al. |
| 6,368,008 | B1 | | 4/2002 | Biernat et al. |
| 6,528,176 | B1 | | 3/2003 | Asai et al. |
| 8,895,148 | B2 | | 11/2014 | Sang et al. |
| 2011/0098382 | A1 | * | 4/2011 | Czaplicki ............. C08G 59/186 523/453 |
| 2014/0113983 | A1 | * | 4/2014 | Czaplicki ................ C08L 71/00 521/92 |
| 2015/0034940 | A1 | * | 2/2015 | Lee ..................... H01L 51/5253 257/40 |
| 2015/0284607 | A1 | | 10/2015 | Imamura |
| 2016/0244603 | A1 | | 8/2016 | Okamoto |

FOREIGN PATENT DOCUMENTS

| EP | 0336732 | 10/1989 |
|---|---|---|
| EP | 3170877 | 5/2014 |
| JP | H05156226 | 6/1993 |
| JP | 2013065052 | 4/2013 |
| WO | WO 2007/014039 | 2/2007 |
| WO | WO 2009/071269 | 6/2009 |
| WO | WO 2010/039614 | 4/2010 |
| WO | WO 2011/141148 | 11/2011 |
| WO | WO 2012/110230 | 8/2012 |
| WO | WO 2014/031838 | 2/2014 |
| WO | WO 2017/087651 | 5/2017 |

OTHER PUBLICATIONS

Texas Natural Supply—Calcium Carbonate. Retrieved on Apr. 29, 2020. (Year: 2020).*
Zuo Yu et al., "Engineering Materials and Corrosion Resistance," China Petrochemical Press, 1st Edition, pp. 198-199, Aug. 31, 2008.
International Search Report for PCT International Application No. PCT/US2016/061761, dated Jan. 18, 2017, 4 pages.
Thermoplastic Abstract Pages from Science Direct, having an abstract from P.K. Mallik, Chapter 5, Thermoplastics and thermoplastic—matrix composites for lightweight automotive structures, in Materials, Design and Manufacturing for Lightweight Vehicles, Woodhead Publishing, pp. 174-207 (2010).

* cited by examiner

*Primary Examiner* — Daniel H Lee
(74) *Attorney, Agent, or Firm* — Carlso M. Téllez Rodriguez; 3M Innovative Properties Company

(57) ABSTRACT

The present disclosure relates to a thermosettable structural adhesive composition comprising an epoxy compound; a thermoplastic compound; an epoxy curing agent; at least one mineral filler, wherein the at least one mineral filler is capable of absorbing water. The thermosettable structural adhesive composition can exhibit an improved corrosion resistance while also providing good adhesive properties such as good t-peel strength and overlap shear strength.

17 Claims, No Drawings

STRUCTURAL ADHESIVE WITH IMPROVED CORROSION RESISTANCE

CROSS REFERENCE TO RELATED APPLICATIONS

This application is a national stage filing under 35 U.S.C. 371 of PCT/US2016/061761, filed Nov. 14, 2016, which claims the benefit of European Application No. 15195394.0, filed Nov. 19, 2015, the disclosures of which are incorporated by reference in their entireties herein.

FIELD

The disclosure relates to a structural adhesive composition and a structural adhesive film comprising the structural adhesive composition, which are suitable for bonding parts, e.g. metal parts/substrates. The present disclosure further relates to a thermoset structural adhesive film obtainable by thermosetting of the structural adhesive film according to the present disclosure, and to a part assembly comprising such a thermoset adhesive film and at least one part. In another aspect, the present disclosure relates to a method for bonding parts, e.g. metal parts/substrates. In still a further aspect, the present disclosure relates to the use of such structural adhesive films for bonding parts, e.g. metal parts.

BACKGROUND

Metal joints in vehicles may be formed through the use of an adhesive. For example, an adhesive may be used to bond a metal panel, for example a roof panel to the support structure or chassis of the vehicle. Further, an adhesive may be used in joining two metal panels of a vehicle closure panel. Vehicle closure panels typically comprise an assembly of an outer and an inner metal panel whereby a hem structure is formed by folding an edge of an outer panel over an edge of the inner panel. Typically, an adhesive is provided there between to bond the panels together. Further, a sealant typically needs to be applied at the joint of the metal panels to provide for sufficient corrosion resistance. For example, U.S. Pat. No. 6,000,118 discloses the use of a flowable sealant bead between the facing surfaces of the two panels, and a thin film of uncured paint-like resin between a flange on the outer panel and the exposed surface of the inner panel. The paint film is cured to a solid impervious condition by a baking operation performed on the completed door panel. U.S. Pat. No. 6,368,008 discloses the use of an adhesive for securing two metal panels together. The edge of the joint is further sealed by a metal coating. WO 2009/071269 discloses an expandable epoxy paste adhesive as a sealant for a hem flange. A further hemmed structure is disclosed in U.S. Pat. No. 6,528,176.

Further efforts have been undertaken to develop adhesive compositions whereby two metal panels, in particular an outer and an inner panel of a vehicle closure panel, could be joined with an adhesive without the need for a further material for sealing the joint. Thus, it became desirable to develop adhesive systems that provide adequate bonding while also sealing the joint and providing corrosion resistance. A partial solution has been described in e.g. WO 2007/014039, which discloses a thermally expandable and curable epoxy-based precursor of an expanded thermoset film toughened foamed film comprising a mixture of solid and liquid epoxy resins, and claimed to provide both favorable energy absorbing properties and gap filling properties upon curing. Another partial solution has been described in WO 2011/141148, which describes a heat activated structural adhesive that is solid and dry to the touch at ambient temperature, that can be activated to develop adhesive properties at an elevated temperature and which can be moulded without curing.

Moreover, it is also very desirable that the thermoset film obtained from a structural adhesive composition exhibits a certain resistance towards corrosion and aging. Due to the methods employed in industrial applications such as bonding parts in a series of process steps which may include application of the adhesive to oily surfaces and immersion of the parts and the adhesive in other liquid compositions and the requirements of the bonded assembly, the adhesive should work under a number of process conditions while further providing good performance after aging.

Without contesting the technical advantages associated with the adhesive compositions and systems disclosed in the art, there is still a need for a high performance structural adhesive which combines certain handling properties in uncured state as well as excellent bonding performance after curing, in particular after being exposed to aging or corrosion conditions such as elevated temperatures and moisture over a certain period of time.

SUMMARY

According to a first aspect, the present disclosure provides a thermosettable structural adhesive composition comprising an epoxy compound; a thermoplastic compound; an epoxy curing agent; and at least one mineral filler, wherein the at least one mineral filler is capable of absorbing water.

According to a second aspect, the present disclosure relates to a corrosion resistant structural adhesive film, comprising the structural adhesive composition as described herein.

In another aspect, the present disclosure provides a method for bonding parts, the method comprising the following steps:

i. Providing a first part and a second part;
ii. Providing a structural adhesive composition or a structural adhesive film according to the present disclosure to at least one surface of the first part and/or the second part,
iii. Adhering the first part and the second parts at a temperature below the activation temperature lower than the activation temperature of the epoxy curing agent, thereby forming a joint between the first and the second part, preferably forming a metal joint between the first and the second part,
iv. Heating the joint at a temperature higher than the activation temperature of the epoxy curing agent, so as to cause thermosetting of the thermosettable composition.

According to a further aspect, the present disclosure relates to a part assembly comprising a first part and a second part, and a thermoset structural adhesive film having a first portion near a first end of the structural adhesive film and a second portion near the second end opposite to the first end of the structural adhesive film. The thermoset structural adhesive film is provided between the first part and the second part and adheres the first part and the second metal together, and the thermoset structural adhesive film is obtained by thermosetting of the thermosettable composition or the structural adhesive film as described herein.

In yet another aspect, the present disclosure relates to a use of the thermosettable composition or the structural adhesive film according to the present disclosure for bonding parts in industrial applications, preferably in body-in-white processes.

DETAILED DESCRIPTION

Before any embodiments of this disclosure are explained in detail, it is to be understood that the disclosure is not limited in its application to the details of construction and the arrangement of components set forth in the following description. The disclosure is capable of other embodiments and of being practiced or of being carried out in various ways. As used herein, the term "a", "an", and "the" are used interchangeably and mean one or more; and "and/or" is used to indicate one or both stated cases may occur, for example A and/or B includes, (A and B) and (A or B). Also herein, recitation of ranges by endpoints includes all numbers subsumed within that range (e.g., 1 to 10 includes 1.4, 1.9, 2.33, 5.75, 9.98, etc.). Also herein, recitation of "at least one" includes all numbers of one and greater (e.g., at least 2, at least 4, at least 6, at least 8, at least 10, at least 25, at least 50, at least 100, etc.). Also, it is to be understood that the phraseology and terminology used herein is for the purpose of description and should not be regarded as limiting. Contrary to the use of "consisting", which is meant to be limiting, the use of "including," "containing", "comprising," or "having" and variations thereof is meant to be not limiting and to encompass the items listed thereafter as well as additional items.

Amounts of ingredients of a composition may be indicated by % by weight (or "% wt". or "wt.-%") unless specified otherwise. The amounts of all ingredients gives 100% wt unless specified otherwise. If the amounts of ingredients is identified by % mole the amount of all ingredients gives 100% mole unless specified otherwise. In particular, the amounts of ingredients may be indicated by parts per hundred parts fluoroelastomer.

Unless explicitly stated otherwise, all embodiments of the present disclosure can be combined freely.

According to a first aspect, the present disclosure provides a thermosettable structural adhesive composition comprising
(a) an epoxy compound;
(b) a thermoplastic compound;
(c) an epoxy curing agent;
(d) at least one mineral filler, wherein the at least one mineral filler is capable of absorbing water.

It has been surprisingly found that a thermosettable structural adhesive composition comprising the combination of above (a) to (d) may provide thermoset films exhibiting desired adhesive properties such as high peel strength and high overlap shear strength, in particular after being subjected to aging conditions such as cataplasma conditions, as well as corrosion resistance.

Epoxy Compound

The structural adhesive film according to the present disclosure, comprises a thermosettable composition that comprises an epoxy compound having an average epoxy equivalent weight of less than 250 g/equivalent. Suitable epoxy compounds for use herein will be easily identified by those skilled in the art, in the light of the present description.

In a preferred aspect, the epoxy compound for use herein has an average epoxy equivalent weight of less than 250 g/equivalent, preferably of less than 230 g/equivalent, more preferably less than 220 g/equivalent, even more preferably less than 200 g/equivalent. Preferably, the epoxy compound for use herein has an average epoxy equivalent weight comprised between 100 and 200 g/equivalent, preferably between 150 and 200 g/equivalent, more preferably between 170 and 200 g/equivalent. Preferably still, the epoxy compound for use herein has a weight average molecular weight of not more than 700 g/mol, preferably not more than 500 g/mol, more preferably not more than 400 g/mol. Advantageously, the epoxy compound for use herein has a weight average molecular weight comprised between 200 and 400 g/mol, preferably between 300 and 400 g/mol, more preferably between 350 and 400 g/mol. The epoxy compound for use herein is preferably selected from the group of epoxy compounds having an average epoxy functionality, i.e. an average number of polymerizable epoxy groups per molecule, of at least 2 and, more preferably, from 2 to 4.

Any organic compound having at least one oxirane ring polymerizable by a ring opening reaction may be used as an epoxy compound in the thermosettable composition of the structural adhesive film according to the disclosure, provided they have an average epoxy equivalent weight of less than 250 g/equivalent. Such materials, broadly called epoxies, include monomeric epoxy compounds and polymeric epoxy compounds and can be aliphatic, cycloaliphatic, aromatic or heterocyclic. Useful materials generally have at least two polymerizable epoxy groups per molecule and, more preferably, from two to four polymerizable epoxy groups per molecule.

These epoxy compounds are generally liquid, or semi-liquid, at room temperature and are frequently also referred to as reactive epoxy thinners or reactive epoxy diluents. These compounds are preferably selected from the group of optionally substituted di- and polyglycidyl ethers of di- and polyphenols or aliphatic or cycloaliphatic hydroxyl compounds. Suitable epoxy compounds for use herein are commercially available from Momentive under tradename Epikote™ 828; from Dow Chemical Co. under tradename DER 331, DER 332 and DER 334; from Resolution Performance Products under tradename Epon® 828; from Polysciences, Inc. under tradename Epon® 825/826/830/834/863/824; from Hexion under tradename Bakelite® EPR 164; from Huntsman under tradename Araldite® GY 250/260; or from Leuna Harze under tradename EPILOX® A 1900.

Epoxy compounds which are useful in the structural adhesive compositions according to the present disclosure are preferably derived from bisphenol A, bisphenol E, bisphenol F, bisphenol S, aliphatic and aromatic amines, such as methylene dianiline and aminophenols, and halogen substituted bisphenol resins, novolacs, aliphatic epoxies, and combinations thereof and/or therebetween. More preferably, the organic epoxies are selected from the group comprising diglycidyl ethers of bisphenol A and bisphenol F and epoxy novolacs.

The amount of epoxy compound in the thermosettable structural adhesive composition is preferably comprised from 20 to 50 wt.-%, preferably from 30 to 50 wt.-%, more preferably from 38 to 50 wt.-%, based on the total weight of the thermosettable structural adhesive composition.

Thermoplastic Compound

The thermosettable composition structural adhesive according to the present disclosure further comprises a thermoplastic compound preferably having a softening point comprised between 30° C. and 140° C. Suitable thermoplastic compounds for use herein will be easily identified by those skilled in the art, in the light of the present description. Preferably, the thermoplastic compound is a thermoplastic resin. Thus, the terms "thermoplastic compound" and "thermoplastic resin" may be used interchangeably in the present disclosure. Thermoplastic compounds and thermoplastic resins may also frequently be referred to as film forming agents.

In a preferred aspect, thermoplastic resins for use herein have a softening point comprised between 70° C. and 120° C., preferably between 80° C. and 100° C., more preferably between 85° C. and 95° C. Suitable thermoplastic resins for use herein are preferably selected from the group consisting of polyether thermoplastic resins, polypropylene thermoplastic resins, polyvinyl chloride thermoplastic resins, polyester thermoplastic resins, polycaprolactone thermoplastic resins, polystyrene thermoplastic resins, polycarbonate thermoplastic resins, polyamide thermoplastic resins, and any combinations of mixtures thereof.

Suitable thermoplastic resins for use herein may be advantageously selected from the group of polyether thermoplastic resins, and preferably polyhydroxyether thermoplastic resins. In a preferred aspect, thermoplastic resins for use herein are selected from the group of polyhydroxyether thermoplastic resins, which are preferably selected from the group consisting of phenoxy resins, polyether diamine resins, polyvinylacetal resins, in particular polyvinyl butyral resins, and any combinations or mixtures thereof. Examples of suitable polyvinylacetal resins for use herein include Vinyl Chloride/Vinyl Acetate Copolymers, Carboxyl-Modified Vinyl Copolymers, and Hydroxyl-Modified Vinyl Copolymers, commercially available from Dow Chemicals. In a very preferred aspect of the disclosure, the thermoplastic resin for use herein is selected from the group of phenoxy resins. Suitable thermoplastic resins for use herein are commercially available from InChem Corporation under trade designation PKHP, PKHH, PKHA, PKHB, PKHC, PKFE, PKHJ, PKHM-30 or PKHM-301, PKCP.

The amount of thermoplastic resin in the thermosettable composition of the structural adhesive film is typically comprised from 7 to 40 wt.-%, preferably from 10 to 24 wt.-%, more preferably from 15 to 24 wt.-%, of a thermoplastic compound, based on total weight of the thermosettable composition.

It is also preferred that the weight ratio of the epoxy compound and the thermoplastic compound, i.e. the thermoplastic resin is comprised between 0.5 and 4, preferably between 1 and 3, more preferably between 1.5 and 2.5, even more preferably between 1.8 and 2.2.

Epoxy Curing Agent

The thermosettable composition of the structural adhesive film according to the present disclosure further comprises an epoxy curing agent. Any epoxy curing agent, commonly known in the art, may be used in the thermosettable composition of the structural adhesive film of the disclosure. Suitable epoxy curing agents for use herein are materials that react with the oxirane ring of the organic epoxide to cause substantial cross-linking of the epoxide. These materials contain at least one nucleophilic or electrophilic moiety (such as an active hydrogen atom) that causes the cross-linking reaction to occur. Epoxy curing agents are distinct from epoxide chain extension agents, which primarily become lodged between chains of the organic epoxide and cause little, if any, cross-linking. Epoxy curing agents as used herein are also known in the art as epoxy hardeners, epoxide hardeners, catalysts, epoxy curatives, and curatives.

Sometimes, differentiation is made between epoxy curing agents and accelerators which are used to increase the rate of the epoxide curing reaction. Accelerators typically are multifunctional materials which can also be classified as epoxy curing agents. Therefore, in the present specification, no differentiation is made between curing agents and accelerators.

Epoxy curing agents for use herein include those which are conventionally used for curing epoxy resin compositions and forming crosslinked polymer networks. Suitable epoxy curing agents may also be referred to as latent curing agents, which are typically chosen so that they do not react with the epoxy resin until the appropriate processing conditions are applied. Such compounds also include aliphatic and aromatic tertiary amines such as dimethylaminopropylamine and pyridine, which may act as catalysts to generate substantial crosslinking. Further, boron complexes, in particular boron complexes with monoethanolamine, imidazoles such as 2-ethyl-methylimidazole, guanidines such as tetramethyl guanidine, dicyanodiamide (often referred to as DICY), substituted ureas such as toluene diisocyanate urea, and acid anhydrides such as the—methyltetrahydroxyphthalic acid anhydride, 3-methyltetrahydroxyphthalic acid anhydride and methylnorbornenephthalic acid anhydride, may be employed. Still other useful epoxy curing agents include polyamines, mercaptans and phenols. Other epoxy curing agents for use herein include encapsulated amines, Lewis acids salts, transition metal complexes and molecular sieves. Preferably, the epoxy curing agent is selected from the group consisting of amines, acid anhydrides, guanidines, dicyandiamide and mixtures thereof. More preferably, the epoxy curing agent contains dicyandiamide. Suitable epoxy curing agents for use herein are commercially available from Air Products under tradename Amicure® CG-1200 and from CVC Speciality Chemicals under tradename Omicure® U52M.

The amount of epoxy curing agents in the thermosettable composition of the structural adhesive film is typically comprised from 2 to 15 wt.-%, preferably from 2 to 8 wt.-%, more preferably from 2 to 4 wt.-%, based on total weight of the thermosettable composition.

Toughening Agent

In a particular aspect, the thermosettable composition of the structural adhesive film may further comprise one or more toughening agents. Any toughening agent commonly known in the art may be used in the thermosettable composition of the structural adhesive film of the disclosure. The toughening agents are preferably selected from a group comprising core-shell toughening agents, CTBNs (carboxyl and/or nitrile terminated butadiene/nitrile rubbers) and high molecular weight amine terminated polytetramethylene oxide.

Core-shell toughening agents which are especially preferred, usually comprise different materials in the inner core region and the outer shell region, respectively. Preferably, the core may be harder than the shell but this is not required. The shell may comprise harder material and/or the shell may be layered in its construction. Most preferably, the inner hard core component is comprised of a single and/or a plurality of organic polymers and inorganic oxides from the first, second and/or third transition series of the periodic table such as silica, alumina, zirconia, and/or naturally occurring minerals such as feldspars, silicates, aluminates, zirconates, and/or other hardened materials such as carbides, nitrides, silicides, aluminides, and/or some combination thereof and therebetween. The outer soft shell component may be comprised of rubbers such as diene, olefin rubbers, natural rubber, polyisoprene, copolymers thereof, ethylene propylene monomer rubber, diene-acrylonitrile copolymers, copolymers of vinyl aromatic monomers, styrene-butadiene copolymers known as SBR rubbers, and terpolymers of dienes with acrylonitrile or unsaturated esters and styrene or vinyl toluene. The soft shell preferably includes modifications with functionalities such as carboxyl, hydroxyl, epoxy, cyanates, isocyanates, amino, and thiol which can react with the epoxy components of the precursor. Core-shell toughening agents which are useful in the thermosettable composition are commercially available, for example, from DOW under the trade designation Paraloid™, or Kane Ace™ MX153 from Kaneka, or Clearstrength™ products from Arkema Alternative core shell material are acrylic impact modifiers from Arkema, with products from the trade name Durastrength.

CTBN toughening agents react through their carboxyl and/or nitrile functional groups with the epoxide component of the precursor during curing thereby introducing their butadiene/nitrile rubber portion as a soft, shock-absorbing segment into the epoxy network forming a hard segment. CTBN toughening agents which are useful in the present disclosure are commercially available, for example, from Hanse Chemie AG, Hamburg, Germany, under the trade designation Albipox™.

A high molecular weight amine terminated polytetramethylene oxide useful in the thermosettable composition is commercially available, for example, from 3M Company, St. Paul/Minn., USA, under the trade designation "3M EPX™ Rubber".

The amount of the one or more toughening agents present in the thermosettable composition is typically comprised between from 10 to 40 wt.-%, preferably between 10 and 30 wt.-%, more preferably between 10 and 20 wt.-%, based on total weight of the thermosettable composition.

In a particular aspect of the structural adhesive composition according to the present disclosure, the weight ratio of the toughening agent and the thermoplastic resin is advantageously comprised between 1 and 4, preferably between 1 and 3, more preferably between 1.5 and 2.5, even more preferably between 1.8 and 2.2.

Mineral Filler

The structural adhesive compositions according to the present disclosure comprise at least one mineral filler capable of absorbing water. Combining such a mineral filler with the epoxy compound, the thermoplastic resin and the epoxy curing agent has the effect that an increased corrosion resistance and/or aging resistance of the composition and the films described herein may be observed. In this regard, it is preferred that the mineral filler is capable of chemically reacting with water. This has the common meaning in the art, i.e. the mineral filler undergoes a chemical reaction with water, thereby effectively absorbing water which may come into contact with the structural adhesive compositions, either in uncured state or even more preferably in cured, i.e. thermoset state in application. Without wanting being bound to theory, it is believed that this specific property of the mineral filler as described herein removes water which may have entered the cured adhesive and which could otherwise may lead to weakened bonding within the adhesive or bonding between adhesive and substrate.

It is preferred that the mineral filler is selected from the group consisting of metal oxides and metal hydroxides, preferably selected from the group consisting of MgO, CaO, BaO, $K_2O$, $Li_2O$, $Na_2O$, SrO, and mixtures thereof. These compounds were found to show particular good water-absorbing capabilities. This is probably due to their capability of chemically reacting with water. The mineral filler may advantageously be employed as a blend together with other compounds, in particular other mineral fillers. These compounds may act as further reinforcement of the structural adhesive composition or even add to the adhesive strength. Thus, it is preferred that the at least one mineral filler is MgO, CaO, BaO, $K_2O$, $Li_2O$ and/or $Na_2O$, preferably is a blend comprising MgO, CaO, BaO, $K_2O$, $Li_2O$, $Na_2O$ and $SiO_2$, more preferably is a blend comprising MgO, CaO and $SiO_2$, metal silicates, carbonates, silicates, hydrated silicates (talc), borates, oxides, hydroxides, sulfates titanates, zirconates, even more preferably is a blend comprising CaO and $SiO_2$. With regard to the $SiO_2$, it is preferred that it is selected from fumed silica, fused silica, silica gel, and quartz, preferably selected from fumed silica and fused silica, and more preferably is fused silica.

CaO may be obtained commercially, as well as $SiO_2$ such as fused silica. For example, fused silica may be obtained from Minco Inc. under the trade designation MinSil 20. Hydrophobic fumed silica is commercially available as Aerosil™ from Evonik or CAB-O-SIL™ from Cabot.

The structural adhesive composition according to the present disclosure preferably comprises the mineral filler in an amount of from 0.5 to 50 wt.-% relative to the total weight of the composition, preferably of from 2 to 40 wt.-% relative to the total weight of the composition, more preferably of from 10 to 30 wt.-% relative to the total weight of the composition.

In a further preferred embodiment of the present disclosure, the structural adhesive composition comprises as mineral filler component silica, preferably fused silica, in an amount of from 5 to 30 wt.-% relative to the total weight of the composition, preferably from 10 to 20 wt.-% relative to the total weight of the composition, and calcium oxide in an amount of from 0.5 to 20 wt.-% relative to the total weight of the composition, preferably from 2 to 14 wt.-% relative to the total weight of the composition.

Reactive Diluent

It is preferred that the structural adhesive compositions according to the present disclosure further comprise at least one component (e) comprising at least one epoxy moiety and at least one linear or branched alkyl group. These compounds may act as reactive diluents. Thus, the term reactive diluent may be used interchangeably with the term component € having at least one epoxy moiety and at least one linear or branched alkyl group. The use of these compounds may have the effect that while adhesion is generally improved, the adhesion to substrate surfaces, in particular metal substrate surfaces, which are at least partially covered with oil, is also improved. This is particularly useful for industrial applications, in particular where metal substrates are bonded to other metal substrates. An example for such a process where improved adhesion properties on oily metal surfaces are highly desirable is the so-called body-in-white process commonly used in the automotive industry. Without wanting to being bound to theory, it is believed that the presence of alkyl groups increase the compatibility between the adhesive and the oil which may be present on metal surfaces of substrates in industrial processes. This may have the effect that adhesion strength is improved, which also leads to better corrosion protection of the bonded joints. On the other hand, the presence of the at least one epoxy group may ensure that the reactive diluent is build into the epoxy matrix.

Preferably, the component (e), i.e. the reactive diluent, is a compound according to formula (I)

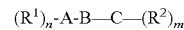　　(formula (I))

wherein
$R^1$ is linear or branched alkyl,
$R^2$ is an epoxy moiety

A, B, C are different or the same and are linear or branched alkyl, alkoxy, alkene, alkine, phenyl, phenoxy, carboxy and are optionally substituted with linear or branched alkyl, alkoxy, alkene, alkine, phenyl, phenoxy and carboxy;

n is 1, 2, or 2;

m is 1, 2, or 3.

Moreover, it is preferred that the at least one reactive diluent is a glycidyl ether. In particular, it is preferred that the at least one reactive diluent is selected from compounds (i), (ii) and (iii) below.

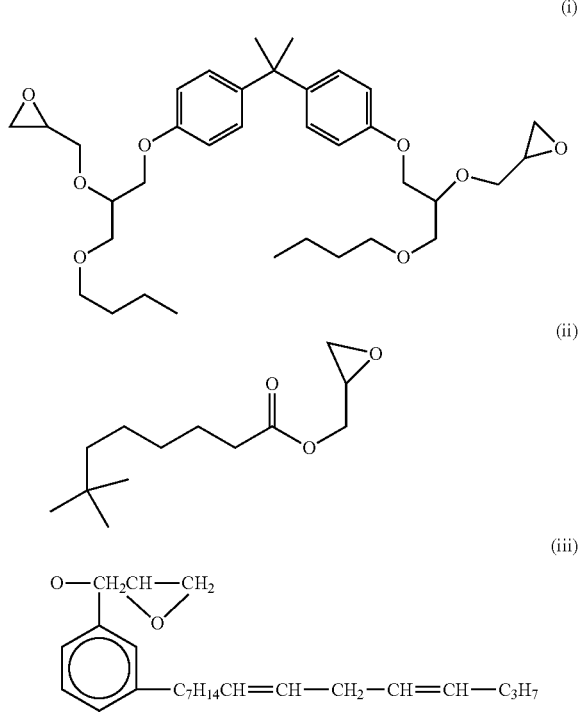

Reactive diluents useful for the structural adhesive compositions according to the present disclosure may be commercially obtained under the trade designations Cardolite UltraLite 513, Cardura E10P and Araldite PY 4122.

It is preferred that the structural adhesive compositions according to the present disclosure comprise at least one component (e) (reactive diluent) in an amount of from 0.1 to 20 wt.-% relative to the total weight of the composition, preferably of from 1 to 15 wt.-% relative to the total weight of the composition, more preferably of from 1.5 to 10 wt.-% relative to the total weight of the composition, and even more preferably of from 2 to 7 wt.-% relative to the total weight of the composition.

Further Filler

The structural adhesive compositions according to the present disclosure preferably further comprise a further filler (f) selected from the list of carbon black, graphite, a mineral carbon source, glass beads, glass chips, metal chips, metal flakes, glass bubbles, organic and inorganic fibers, preferably graphite, glass beads, glass chips, more preferably graphite, even more preferably graphite flakes. Preferably, the further filler (f) is in the form of non-spherical particles. Using non-spherical particles has the effect of providing an improved failure mode and high mechanical strength to the adhesive compositions and adhesive films according to the present disclosure. "Failure mode" has the meaning as common in the art, i.e. the desirable "cohesive failure mode" describes a case where the failure appears only in the adhesive layer, and not between the adhesive layer and the substrate.

It is preferred that the non-spherical particles are inorganic particles, preferably consist of a material selected from metal, carbon and glass. The metal is preferably selected from iron, steel, aluminium, titanium, magnesium and mixtures and alloys thereof. Non-spherical particles consisting of carbon are preferred. In this regard, graphite and carbon black are preferred, in particular graphite, more preferably thermally expandable graphite.

The particles generally have a non-spherical shape. This has the common meaning used in the art, i.e. the particle are not spherical. Spherical particles generally have an aspect ratio of about 1:1, i.e. one diameter of the particle is about the same as a second diameter of the same particle being about perpendicular to the first diameter of the particle. Thus, it is preferred that the particles have either an irregular shape or a flake shape. Since flake-shaped particles gave the best results with regard to adhesive strength and cohesive failure mode, flake-shaped particles are preferred in the structural adhesive compositions according to the present disclosure. Preferably, the non-spherical particles as described herein have an aspect ratio of at least 1:2.5, preferably in the range of from 1:2.5 to 1:20, more preferably in the range of from 1:4 to 1:7.

It was further found that the above-described effects may be linked to the grain size of the non-spherical particles. Particles above a certain grain size resulted in adhesive strength and failure mode which compared unfavourable to corresponding performances of structural adhesive compositions where non-spherical particles having a grain size of 200 μm and less were used. Hence, it is preferred that the non-spherical particles have a grain size of 200 μm and less. Similarly, the non-spherical particles should have at least a certain grain size in order to show any influence to the failure mode. Accordingly, it is preferred that the non-spherical particles have a grain size of at least 30 μm. Thus, it is preferred that the non-spherical particles, preferably flake shaped particles, have a grain size in the range of from 30 μm to 200 μm. In another preferred embodiment of the present disclosure, the non-spherical particles have an irregular shape and a grain size of 100 μm and less, preferably of 80 μm and less, preferably in the range of from 30 μm to 100 μm, more preferably in the range of from 30 μm to 80 μm.

Particular desirable effects in this regard may be observed when using graphite flakes. Thus, it is preferred that the further filler (f) comprises graphite, preferably thermally expandable graphite, more preferably thermally expandable graphite flakes.

Examples for suitable non-spherical particles as described herein are ES 100C10, ES 20C200, Expan C-8099 lite, Graphite FP 99.5 and Eckart Aluminium.

It is further preferred that the structural adhesive composition according to the present disclosure comprises the further filler (f) in an amount of from 0.1 to 10 wt.-% relative to the total weight of the composition, preferably in an amount of from 0.5 to 7 wt.-% relative to the total weight of the composition, more preferably in an amount of from 1.0 to 5 wt.-% relative to the total weight of the composition.

In a preferred embodiment, the structural adhesive composition according to the present disclosure comprises:

(a) from 20 to 50 wt.-%, preferably from 30 to 50 wt.-%, more preferably from 38 to 50 wt.-%, of an epoxy compound preferably having an average epoxy equivalent weight of less than 250 g/equivalent, preferably less than 230 g/equivalent, more preferably less than 220 g/equivalent, even more preferably less than 200 g/equivalent;

(b) from 7 to 40 wt.-%, preferably from 10 to 24 wt.-%, more preferably from 15 to 24 wt.-%, of a thermoplastic compound preferably having a softening point in the range of from 60° C. and 140° C.;

(c) from 2 to 15 wt.-%, preferably from 2 to 8 wt.-%, more preferably from 2 to 4 wt.-%, of an epoxy curing agent;

(d) from 0.5 to 50 wt.-% relative to the total weight of the composition, preferably of from 2 to 40 wt.-% relative to the total weight of the composition, more preferably of from 10 to 30 wt.-% relative to the total weight of the composition of a mineral filler.

Blowing Agent

In a particular aspect, the thermosettable structural adhesive composition may further comprise one or more blowing agents. Any blowing agent, commonly known in the art, may be used in the thermosettable structural adhesive composition of the present disclosure.

By including a blowing agent in the thermosettable structural adhesive film, the structural adhesive composition becomes heat expandable and may be referred to as an expandable structural adhesive composition. Accordingly, by heating, for example during the heating to cause thermosetting of the adhesive sheet, the structural adhesive composition expands which helps sealing of any gap in a metal joint. As a result, corrosion resistance may be improved. The one or more blowing agents are preferably selected from the group of non-encapsulated and encapsulated blowing agents.

Non-encapsulated blowing agents, which are sometimes also referred to as chemical blowing agents, release a gaseous compound such as nitrogen, nitrogen oxide, hydrogen or carboxide dioxide during heating. Chemical blowing agents which are useful in the present disclosure include, for example, azobisisobutyronitriles, azodicarbonamides, carbazides, hydrazides, non-azo chemical blowing agents based on sodium borohydride or sodium bicarbonate/citric acid and dinitrosopentamethylenetetramine. The amount of the one or more chemical blowing agents is typically comprises between 0.2 and 2 wt.-%, preferably between 0.5 and 1.5 wt.-%, based on the total weight of the thermosettable composition.

Encapsulated blowing agents usually comprise liquified gases such as, for example, trichlorofluoromethane or hydrocarbons such as n-pentane, iso-pentane, neo-pentane, butane and/or iso-butane encapsulated in a polymeric thermoplastic shell. Upon heating the liquified gas expands and enlarges or blows up the thermoplastic shell like a "micro-balloon". Typically, the amount one or more encapsulated blowing agents may be advantageously comprised between from 0.5 to 10 wt.-%, preferably from 1 to 5 wt.-%, more preferably from 1 to 2 wt.-%, based on the total weight of the thermosettable composition. Encapsulated blowing agents, which are useful in the thermosettable composition, are commercially available, for example, from Pierce & Stevens Chemical Corp under the trade designation Micropearl™, from Matsumoto under the trade name Microsphere™ or from Akzo Nobel under the trade name Expancel™.

In a particular aspect, the amount of one or more blowing agents is selected such as to provide the structural adhesive composition with a free expansion rate upon curing of not more than 50%, preferably not more than 40%, more preferably not more than 30%, when subjecting the structural adhesive film to a curing temperature above the activation (onset) temperature of the curing reaction, and when measured as described in the Test Methods section. More in particular, the amount of one or more blowing agents is selected such as to provide the structural adhesive composition with a free expansion rate upon curing of between 10 and 40%, preferably between 10 and 30%, more preferably between 15 and 25%.

Another aspect of the present disclosure is a corrosion resistant structural adhesive film, comprising the structural adhesive composition as described herein.

Using structural adhesive films provides several advantages for the user in particular in industrial applications in that such films may be particularly suitable for automated handling and applications, in particular by fast robotic equipment. More particularly, the structural adhesive film of the present disclosure enables efficient automation of the process of forming a joint between metal plates, which is of special interest e.g. in the automotive industry. In addition, the structural adhesive film offers good adhesive properties such as good T-peel strength and overlap shear strength, even on metal surfaces at least partially covered with oil, and show good adhesive properties even in an aged state, such as after a cataplasma test.

The structural adhesive film according to the present disclosure may be readily prepared by a number of techniques. For example, the various components may be added under ambient conditions to a suitable internal mixing vessel, such as a Mogul mixer. The mixing temperature is not critical and the mixing of the first and second epoxy components and the optional toughening agent component is typically performed at a temperature of 80-85° C. When the epoxy curing agent component and the optional blowing agent component is added the temperature may preferably be decreased to not more than 70° C. Mixing is continued until the components form a homogeneous mixture, after which time the thermosettable structural adhesive composition is removed from the mixer. Alternatively, the mixing may be carried out continuously by compounding in a suitable extruder.

Due to their excellent processability the thermosettable composition can be processed as a film by conventional application equipment such as extruders or hot-melt coaters, or colanders. The thermosettable composition may be processed as a self-supporting film or may alternatively be coated/laminated onto a suitable liner, such as e.g. a siliconized liner. The structural adhesive film of the disclosure may be applied to various substrates such as, for example, metals (for example, Al, Al alloys, titanium or stainless steel) or other substrates comprising, for example, glass, boron, carbon, Kevlar fibers, epoxy, phenols, cyanate esters and polyester matrices.

The structural adhesive film according to the disclosure is typically a soft conformable film, and may or may not be tacky at room temperature. Prior to curing, the structural adhesive film is preferably deformable and drapable so that it can applied to curved surfaces and assume any two-dimensional shape. The thickness of the structural adhesive film material may vary widely. Useful thicknesses have been found to be in the range of about 0.05 mm to 25 mm. For typical joining of metal panels, thicknesses may range from 0.1 to 5 mm, for example from 0.1 to 3 mm, or from 0.3 to 1 mm.

The structural adhesive film may be packaged in the form of rolls of film material, rolls of tapes, i.e., lengths of material in narrow widths, or stacks of sheets cut to a desired dimension or shape for the end use. If the adhesive film is tacky, a release liner may be interleaved between adjacent sheets or wraps of a roll. In the context of the present disclosure, it has been surprisingly found that where the structural adhesive film is packaged in the form of rolls of film material, the corresponding roll of film material is particularly resistant to oozing (i.e. the diffusing of epoxy resin out if the roll of film) upon storage. Without wishing to be bound by theory, it is believed that the long polymeric chains comprised in the thermoplastic resin participate in retaining the epoxy resin into the structural adhesive film upon storage. In particular, the structural adhesive film of the disclosure remains oozing-resistant when packaged in the form of rolls of film material having a length of above 100 m, preferably above 200 m, more preferably above 300 m, even more preferably above 500 m, still more preferably above 700 m, yet more preferably above 800 meters, and having a width typically comprised between 5 and 40 mm, in particular between 10 and 30 mm, more in particular between 10 and 20 mm.

The structural adhesive film of the disclosure may include one or more layers. The adhesive film may also include a netting or carrier layer. A suitable netting or carrier layer includes an open cloth or fabric of a polymeric material. The carrier layer preferably comprises cotton, glass, polyester, polyamide, polypropylene, polyurethane, polyethylene, polyviscose, carbon fibers, aramid fibers, metal and any combinations and mixtures thereof. Generally, the netting will be soft and may be stretchable. A particular example includes a heat set, soft and stretchy open nylon knitted cloth. The netting may have a thickness of 1 to 15 $g/m^2$, for example 5 to 12 $g/m^2$. A useful material includes 3M™ Scotch-Weld™ 3336 available from 3M Co. The structural adhesive film may also include an open non-woven layer such as a scrim.

The structural adhesive film according to the present disclosure is suitable to provide any benefit selected from the group consisting of form stability, flexibility, robustness, handling properties, suitability for automated handling and application, wash-out resistance with warm water, in uncured state; excellent bonding and sealing performance, high mechanical strength, water barrier properties, gap filling properties, controlled expansion behaviour, and smooth finish after curing.

As apparent from above, the structural adhesive film may also consist of only the structural adhesive composition as described herein. Accordingly, the advantages and effects as described in connection with the composition may also apply for the film and vice versa.

The structural adhesive composition and the structural adhesive film according to the present disclosure preferably provide an overlap shear strength according to DIN EN 1465 of at least 21 MPa at −40° C. and/or of at least 17 MPa at 23° C. and/or at least 11 at 80° C., preferably on a steel substrate at least partially covered with oil.

Similarly, the structural adhesive composition and the structural adhesive film according to the present disclosure preferably provide a T-peel strength according to ASTM D1876 of at least 165 N, preferably at least 170 N, more preferably at least 175 N, preferably on a steel substrate at least partially covered with oil.

It is further preferred that the structural adhesive composition and the structural adhesive film according to the present disclosure provide a drop of overlap shear strength according to DIN EN 1465 after cataplasma conditions of 30% or less, preferably of 25% or less, more preferably of 20% or less, even more preferably of 15% or less, preferably on a steel substrate at least partially covered with oil.

According to another aspect, the present disclosure provides a method for bonding parts, the method comprising the following steps:
i. Providing a first part and a second part;
ii. Providing a structural adhesive composition according or a structural adhesive film as described herein to at least one surface of the first part and/or the second part,
iii. Adhering the first part and the second parts at a temperature below the activation temperature lower than the activation temperature of the epoxy curing agent, thereby forming a joint between the first and the second part, preferably forming a metal joint between the first and the second part,
heating the joint at a temperature higher than the activation temperature of the epoxy curing agent, so as to cause thermosetting of the thermosettable composition.

In a preferred embodiment, the material of the first part is the same as the material of the second part. In another preferred embodiment, the material of the first part is different from the material of the second part. Preferably, the material of the first and/or second part is selected from metal, carbon, polymeric materials, composite materials, wood and glass.

Preferably, at least one of the first and second part comprises metal, preferably a metal panel. The metal is preferably selected from steel, stainless steel, zinc-plated steel, nickel-plated steel, chrome-plated steel, titanium, aluminium, zinc, magnesium, and their alloys, and any combinations thereof. With regard to the application in industrial processes, in particular in the automotive industry, at least part of the at least one surface of the first part and/or second part is covered with oil.

According to another aspect, the present disclosure relates to a method for bonding metal parts, the method comprising:
a) providing a first metal part and a second metal part, wherein one of the first metal part and the second metal part comprises a metal panel;
b) providing a structural adhesive film as described above;
c) adhering the first metal part and second metal part at a temperature below the activation temperature of the epoxy curing agent, thereby forming a metal joint; and
d) heating the metal joint at a temperature above the activation temperature of the epoxy curing agent, so as to cause thermosetting of the thermosettable composition of the structural adhesive film.

According to still another aspect, the present disclosure relates to a method of making a metal part assembly, the method comprising:
a) providing a first metal part and a second metal part, wherein one of the first and second metal part comprises a metal panel;
b) providing a structural adhesive film according to any of the preceding claims;
c) adhering the first and second metal part thereby forming a metal joint; and
d) heating the metal joint so as to cause thermosetting of the thermosettable composition of the structural adhesive film.

In a preferred aspect of the methods according to the disclosure, the metal parts are automobile panels joined together at an edge, so as to form a so-called hemmed structure or a hem flange.

Typically the joint of the metal panels for a vehicle closure panel is formed early in the manufacturing process where the panels are often contaminated for example with grease or oil. The structural adhesive film used in connection with the method typically allows bonding of the metal parts and panels to an adequate level while also providing good sealing properties on the joint thereby providing corrosion resistance.

Further, the structural adhesive film can generally be applied to metal parts and panels that may be contaminated to some extent with for example oil and generally there will be no need for cleaning of the parts or panels prior to applying the adhesive sheet. Application of the structural adhesive film through automated equipment such as robot heads is conceivable as well. Moreover, an initial adhesive bond of sufficient strength can be formed such that the metal parts can be held together without the need for clamping during further handling of the joint or manufacturing steps such as for example painting, and prior to thermosetting and forming of the final and permanent bond.

The final adhesive bond advantageously can have good crash resistance and preferably has a good elongation at break such that stress that might be created at the joint can be adsorbed without causing failure of the bond. Further, the structural adhesive film according to the disclosure is sufficiently resistant to washing out and accordingly, the metal parts joint together by the adhesive sheet can be subjected to a washing operation, for example as may be necessary prior to painting.

In yet another aspect, the present disclosure provides a part assembly comprising
(I) A first part and a second part, and
(II) A thermoset structural adhesive film having a first portion near a first end of the structural adhesive film and a second portion near the second end opposite to the first end of the structural adhesive film;
wherein the thermoset structural adhesive film is provided between the first part and the second part and adheres the first part and the second part together, and wherein the thermoset structural adhesive film is obtained by thermosetting of the thermosettable structural adhesive composition or the structural adhesive film according to the present disclosure.

Preferably, the part assembly may be obtained by the methods described herein. Accordingly, the above materials and applications as described for the methods and the preferred embodiments of the method according to the present disclosure also apply for the part assembly as described herein.

Furthermore, since the structural adhesive compositions and the structural adhesive films according to the present disclosure exhibit desirable properties such as high adhesive performance, even on oily substrates, and high corrosion resistance, they are excellently suited for use in bonding parts in various industrial applications. Thus, the present disclosure provides a use of the structural adhesive composition or of the structural adhesive film as described herein for bonding parts in industrial applications, preferably in body-in-white processes. It is preferred that the use comprises producing bonded metal part assemblies wherein the thermoset structural adhesive film exhibits an overlap shear strength according to DIN EN 1465 of at least 21 MPa at −40 C and/or of at least 17 MPa at 23° C. and/or at least 11 at 80° C.

EXEMPLARY EMBODIMENTS

The following numbered exemplary embodiments are for illustrating the present disclosure:
1. A thermosettable structural adhesive composition comprising
(a) an epoxy compound;
(b) a thermoplastic compound;
(c) an epoxy curing agent;
(d) at least one mineral filler, wherein the at least one mineral filler is capable of absorbing water.
2. The structural adhesive composition according to embodiment 1, wherein the at least one mineral filler (d) is capable of chemically reacting with water.
3. The structural adhesive composition according to embodiment 1 or 2, wherein the mineral filler (d) is selected from the group consisting of metal oxides and metal hydroxides, preferably selected from the group consisting of MgO, CaO, BaO, $K_2O$, $Li_2O$, $Na_2O$, SrO, and mixtures thereof.
4. The structural adhesive composition according to any one of the preceding embodiment, wherein the at least one mineral filler (d) is MgO, CaO, BaO, $K_2O$, $Li_2O$ and/or $Na_2O$, preferably is a blend comprising MgO, CaO, BaO, $K_2O$, $Li_2O$, $Na_2O$ and $SiO_2$, more preferably is a blend comprising MgO, CaO and $SiO_2$, metal silicates, carbonates, silicates, hydrated silicates (talc), borates, oxides, hydroxides, sulfates titanates, zirconates, even more preferably is a blend comprising CaO and $SiO_2$.
5. The structural adhesive according to embodiment 4, wherein the $SiO_2$ is selected from fumed silica, fused silica, silica gel, and quartz, preferably selected from fumed silica and fused silica, and more preferably is fused silica.
6. The structural adhesive composition according to any one of the preceding embodiments, further comprising (e) at least one component comprising at least one epoxy moiety and at least one linear or branched alkyl group.
7. The structural adhesive composition according to any one of the preceding embodiments, comprising a further filler (f) selected from the list of carbon black, graphite, a mineral carbon source, glass beads, glass chips, metal chips, metal flakes, preferably graphite, glass beads, glass chips, more preferably graphite, even more preferably graphite flakes. glass bubbles, organic and inorganic fibers, pigments, flame retardants, organophosphorus compounds, chemical and-or physical blowing agents,
8. The structural adhesive composition according to embodiment 7, wherein the composition comprises the further filler (f) in an amount of from 0.1 to 10 wt.-% relative to the total weight of the composition, preferably in an amount of from 0.5 to 7 wt.-% relative to the total weight of the composition, more preferably in an amount of from 1.0 to 5 wt.-% relative to the total weight of the composition.
9. The structural adhesive composition according to any one of the preceding embodiments, wherein the further filler (f) comprises graphite, preferably thermally expandable graphite, more preferably thermally expandable graphite flakes.
10. The structural adhesive according to embodiment 9, wherein the further filler (f) has a particle size in the range of from 30 μm to 200 μm and/or an aspect ratio of at least 1:2.5, preferably in the range of from 1:1.25 to 1:20, more preferably in the range of from 1:4 to 1:7.
11. The structural adhesive composition according to any one of the preceding embodiments, wherein the composition comprises the at least one component (e) in an amount of from 0.1 to 20 wt.-% relative to the total weight of the composition, preferably of from 1 to 15 wt.-% relative to the total weight of the composition, more preferably of from 1.5 to 10 wt.-% relative to the total weight of the composition, and even more preferably of from 2 to 7 wt.-% relative to the total weight of the composition.
12. The structural adhesive composition according to any one of the preceding embodiments, wherein the composition comprises the at least one mineral filler (d) in an amount of from 0.5 to 50 wt.-% relative to the total weight of the composition, preferably of from 2 to 40 wt.-% relative to the total weight of the composition, more preferably of from 10 to 30 wt.-% relative to the total weight of the composition.
13. The structural adhesive composition according to embodiment 12, wherein the composition comprises as mineral filler component (d) silica, preferably fused silica, in an amount of from 5 to 30 wt.-% relative to the total weight of the composition, preferably from 10 to 20 wt.-% relative to the total weight of the composition, and calcium oxide in an amount of from 0.5 to 20 wt.-% relative to the total weight of the composition, preferably from 2 to 14 wt.-% relative to the total weight of the composition.
14. The structural adhesive composition according to any one of the preceding embodiments, wherein the epoxy compound (a) epoxy compound has an average epoxy equivalent weight of less than 250 g/equivalent, preferably less than 230 g/equivalent, more preferably less than 220 g/equivalent, even more preferably less than 200 g/equivalent.
15. The structural adhesive composition according to any one of the preceding embodiments, wherein the thermoplastic resin has a softening point in the range of from 30° C. and 140° C.
16. The structural adhesive composition according to any one of the preceding embodiments, wherein the weight ratio of the epoxy compound and the thermoplastic resin is comprised between 0.5 and 4, preferably between 1 and 3, more preferably between 1.5 and 2.5.
17. The structural adhesive composition according to any one of the preceding embodiments, wherein the composition comprises:
  a. from 20 to 50 wt.-%, preferably from 30 to 50 wt.-%, more preferably from 38 to 50 wt.-%, of an epoxy compound preferably having an average epoxy equivalent weight of less than 250 g/equivalent, preferably less than 230 g/equivalent, more preferably less than 220 g/equivalent, even more preferably less than 200 g/equivalent;
  b. from 7 to 40 wt.-%, preferably from 10 to 24 wt.-%, more preferably from 15 to 24 wt.-%, of a thermoplastic compound preferably having a softening point in the range of from 60° C. and 140° C.;
  c. from 2 to 15 wt.-%, preferably from 2 to 8 wt.-%, more preferably from 2 to 4 wt.-%, of an epoxy curing agent;
  d. from 0.5 to 50 wt.-% relative to the total weight of the composition, preferably of from 2 to 40 wt.-% relative to the total weight of the composition, more preferably of from 10 to 30 wt.-% relative to the total weight of the composition of a mineral filler.
18. The structural adhesive composition according to any one of the preceding embodiments, wherein the at least one component (e) is a compound according to formula (I)

(R¹)ₙ-A-B—C—(R²)ₘ    (formula (I))

wherein
R¹ is linear or branched alkyl,
R² is an epoxy moiety
A, B, C are different or the same and are linear or branched alkyl, alkoxy, alkene, alkine, phenyl, phenoxy, carboxy and are optionally substituted with linear or branched alkyl, alkoxy, alkene, alkine, phenyl, phenoxy and carboxy;
n is 1, 2, or 2;
m is 1, 2, or 3.
19. The structural adhesive composition according to embodiment 18, wherein the at least one component (e) is a glycidyl ether.

20. The structural adhesive composition according to embodiment 18 or 19, wherein the at least one component (e) is selected from components

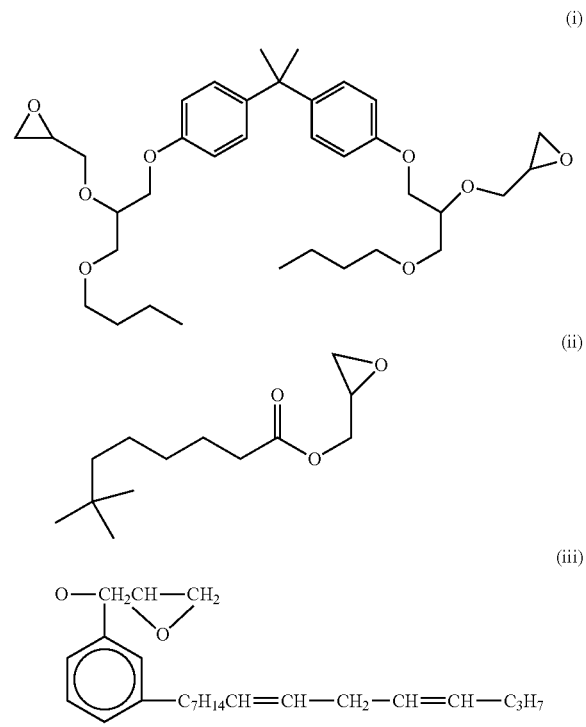

and mixtures and derivates thereof.
21. The structural adhesive composition according to any one of the preceding embodiments, which provides an overlap shear strength according to DIN EN 1465 of at least 21 MPa at −40° C. and/or of at least 17 MPa at 23° C. and/or at least 11 at 80° C.
22. The structural adhesive composition according to embodiment 21, which provides an overlap shear strength according to DIN EN 1465 of at least 21 MPa at −40° C. and/or of at least 17 MPa at 23° C. and/or at least 11 at 80° Con steel substrate at least partially covered with oil.
23. The structural adhesive composition according to any one of the preceding embodiments, which provides a T-peel strength according to ASTM D1876 of at least 165 N, preferably at least 170 N, more preferably at least 175 N.
24. The structural adhesive composition according to embodiment 23, which provides a T-peel strength according to ASTM D1876 of at least 165 N, preferably at least 170 N, more preferably at least 175 N on steel substrate at least partially covered with oil.
25. The structural adhesive composition according to any one of the preceding embodiments, which provides a drop of overlap shear strength according to DIN EN 1465 after cataplasma conditions of 30% or less, preferably of 25% or less, more preferably of 20% or less, even more preferably of 15% or less.
26. The structural adhesive composition according to embodiment 25, wherein the substrates comprise steel, more preferably comprise HD and/or ELO Steel, even more preferably comprise HD steel.
27. A corrosion resistant structural adhesive film, comprising the structural adhesive composition according to any one of embodiments 1 to 26.

28. The structural adhesive film according to embodiment 27, which consists of the structural adhesive composition according to any of embodiments 1 to 26.
29. The structural adhesive film according to any one of embodiments 27 to 28, which provides an overlap shear strength according to DIN EN 1465 of at least 21 MPa at −40° C. and/or of at least 17 MPa at 23° C. and/or at least 11 at 80° C.
30. The structural adhesive film according to embodiment 29, which provides an overlap shear strength according to DIN EN 1465 of at least 21 MPa at −40° C. and/or of at least 17 MPa at 23° C. and/or at least 11 at 80° C on steel substrate at least partially covered with oil.
31. The structural adhesive film according to any one of embodiments 27 to 30, which provides a T-peel strength according to ASTM D1876 of at least 165 N, preferably at least 170 N, more preferably at least 175 N.
32. The structural adhesive film according to embodiment 31, which provides a T-peel strength according to ASTM D1876 of at least 165 N, preferably at least 170 N, more preferably at least 175 N on steel substrate at least partially covered with oil.
33. The structural adhesive film according to any one of embodiments 27 to 32, which provides a drop of overlap shear strength according to DIN EN 1465 after cataplasma conditions of 30% or less, preferably of 25% or less, more preferably of 20% or less, even more preferably of 15% or less.
34. The structural adhesive film according to embodiment 33, wherein the substrates comprise steel, more preferably comprise HD and/or ELO Steel, even more preferably comprise HD steel.
35. The structural adhesive film according to any one of embodiments 27 to 34, further comprising at least one carrier layer, preferably a porous carrier layer, preferably selected from a woven, knit, or non-woven fabric.
36. The structural adhesive film according to embodiment 35, wherein the carrier layer comprises cotton, glass, polyester, polyamide polypropylene, polyurethane, polyethylene, polyviscose, carbon fibers, aramid fibers, metal and any combinations or copolymers thereof.
37. A method for bonding parts, the method comprising the following steps:
   i. Providing a first part and a second part;
   ii. Providing a structural adhesive composition according to any one of embodiments 1 to 26 or a structural adhesive film according to any one of embodiments 27 to 36 to at least one surface of the first part and/or the second part,
   iii. Adhering the first part and the second parts at a temperature below the activation temperature lower than the activation temperature of the epoxy curing agent, thereby forming a joint between the first and the second part, preferably forming a metal joint between the first and the second part,
   iv. Heating the joint at a temperature higher than the activation temperature of the epoxy curing agent, so as to cause thermosetting of the thermosettable composition.
38. Method according to embodiment 37, wherein at least one of the first and the second part comprises metal.
39. Method according to embodiment 37 or 38, wherein at least one of the first and second part is a panel.
40. Method according to any one of embodiments 37 to 39, wherein at least one of the first and second part comprises a metal panel.
41. Method according to any one of embodiments 37 to 40, wherein the material of the first part is the same as the material of the second part.
42. Method according to any one of embodiments 37 to 41, wherein the material of the first part is different from the material of the second part.
43. Method according to any one of embodiments 37 to 42, wherein the material of the first and/or second part is selected from metal, carbon, polymeric material, composite materials, wood and glass.
44. Method according to any one of embodiments 37 to 43, wherein the material of at least one of the first and second part does not comprise metal.
45. Method according to embodiment 43, wherein the metal is selected from steel, stainless steel, zinc-plated steel, nickel-plated steel, titanium, aluminium, zinc, magnesium, and their alloys, and combinations thereof.
46. Method according to any one of embodiments 37 to 45, wherein the metal of the first metal part is distinct from the metal of the second metal part.
47. Method according to any one of embodiments 37 to 46, wherein the metal of the first metal part is the same as the metal of the second metal part.
48. Method according to any one of embodiments 37 to 47, wherein the metal of the first metal part is steel, stainless steel, zinc-plated steel, nickel-plated steel, and the metal of the second metal part is steel, preferably stainless steel, zinc-plated steel, nickel-plated steel.
49. Method according to any one of embodiments 37 to 47, wherein the metal of the first metal part is steel, stainless steel, zinc-plated steel, nickel-plated steel, and the metal of the second metal part is aluminium, titanium, or an alloy comprising one or both of aluminium or titanium.
50. Method according to any one of embodiments 37 to 49, wherein at least part of the at least one surface of the first part and/or second part is covered with oil.
51. A part assembly comprising
   (I) A first part and a second part, and
   (II) A thermoset structural adhesive film having a first portion near a first end of the structural adhesive film and a second portion near the second end opposite to the first end of the structural adhesive film;
   wherein the thermoset structural adhesive film is provided between the first part and the second part and adheres the first part and the second part together, and wherein the thermoset structural adhesive film is obtained by thermosetting of the thermosettable composition according to any one of embodiments 1 to 26 or the structural adhesive film according to any one of embodiments 27 to 36.
52. The part assembly according to embodiment 51, wherein the thermoset structural adhesive film exhibits an overlap shear strength according to DIN EN 1465 of at least 21 MPa at −40° C. and/or of at least 17 MPa at 23° C. and/or at least 11 at 80° C.
53. The part assembly according to embodiment 51 or 52, wherein thermoset structural adhesive film exhibits a t-peel strength according to ASTM D1876 of at least 165 N, preferably at least 170 N, more preferably at least 175 N.
54. The part assembly according to any one of embodiments 51 to 53, wherein the material of the first and/or second part is selected from metal, carbon, polymeric material, composite materials, wood and glass.
55. The part assembly according to any one of embodiments 51 to 54, wherein at least one of the first and second part is a panel.
56. The part assembly according to any one of embodiments 51 to 55, wherein the material of the first part is the same as the material of the second part.

57. The part assembly according to any one of embodiments 51 to 55, wherein the material of the first part is different from the material of the second part.
58. The part assembly according to any one of embodiments 51 to 57, wherein the metal is selected from steel, preferably stainless steel, zinc-plated steel, nickel-plated steel, titanium, aluminium, zinc, magnesium, and their alloys.
59. The part assembly according to any one of embodiments 51 to 58, wherein the metal of the first metal part is distinct from the metal of the second metal part.
60. The part assembly according to any one of embodiments 51 to 58, wherein the metal of the first metal part is the same as the metal of the second metal part.
61. The part assembly according to any one of embodiments 51 to 60, wherein the metal of the first metal part is steel, preferably stainless steel, zinc-plated steel, nickel-plated steel, and the metal of the second metal part is steel, preferably stainless steel, zinc-plated steel, nickel-plated steel.
62. The part assembly according to any one of embodiments 51 to 60, wherein the metal of the first metal part is steel, preferably stainless steel, zinc-plated steel, nickel-plated steel, and the metal of the second metal part is aluminium, titanium, or an alloy comprising one or both of aluminium or titanium.
63. The part assembly according to any of embodiments 51 to 58, wherein the material of the first part is metal and the material of the second part is a composite material or carbon.
64. Use of a thermosettable structural adhesive composition as defined in any one of embodiments 1 to 26 or of a thermosettable structural adhesive film as defined in any one of embodiments 27 to 36 for bonding parts in industrial applications, preferably in body-in-white processes.
65. Use of a thermosettable structural adhesive composition as defined in embodiment 64 of a thermosettable structural adhesive film as defined in any one of embodiments 27 to 36 for producing bonded metal part assemblies wherein the thermoset structural adhesive film exhibits an overlap shear strength according to DIN EN 1465 of at least 21 MPa at −40 C and/or of at least 17 MPa at 23° C. and/or at least 11 at 80° C.

EXAMPLES

The present disclosure is further described without however wanting to limit the disclosure thereto. The following examples are provided to illustrate certain embodiments but are not meant to be limited in any way. Prior to that some test methods used to characterize materials and their properties will be described.
Methods
Overlap Shear Strength according to DIN EN 1465 (issued 2009):
Overlap shear strength is determined according to DIN EN 1465 using a Zwick Z050 tensile tester (commercially available by Zwick GmbH & Co. KG, Ulm, Germany) operating at a cross head speed of 10 mm/min on hot dipped galvanized steel strips (commercially available as DX 54D-Z100 from ThyssenKrupp Steel, Germany) having the following dimension 100 mm×25 mm×0.8 mm and coated with 3 g/m$^2$ Oil (PL 3802-39S commercially available from Fuchs Petrolub AG, Germany). For the preparation of an Overlap Shear Strength test assembly the epoxy film to be tested (having a thickness of 0.4 mm) is applied on one end of a first steel strip and covered by a second steel strip forming an overlap joint of 10 mm. The overlap joints are then clamped together using two binder clips and the test assemblies placed into an air circulating oven with a minimum baking cycle of 20 min at 160° C. and a maximum bake cycle of 45 min at 200° C. Hereby the test assemblies are heated up and cooled down using 3° C./minute ramps. Test assemblies are then conditioned for 24 hours at ambient condition 23+/−2° C. and 50+/−% % relative humidity before testing. As the test temperatures for measuring Overlap Shear Strength are varied from −40° C. to room temperature up to +80° C., the tests assemblies are placed prior to testing on the Zwick tensile tester into an environmental chamber (commercially available by RS Simulatoren, Oberhausen, Germany) and the Overlap shear strength measured at −40° C., room temperature (23° C.+/−2° C.) and +80° C. 3 samples are measured for each of the examples at the three different test temperatures and results averaged and reported in MPa.
Adhesive Peel Strength According to ASTM 1876-08 (Issued 2008)

The Adhesive Peel strength is measured on hot dipped galvanized steel strips (commercially available commercially available as DX 54D-Z100 from ThyssenKrupp Steel, Germany) having the following dimension 15 0 mm×25 mm×0.8 mm and coated with 3 g/m$^2$ Oil (PL 3802-39s commercially available from Fuchs Petrolub AG, Germany) according to ASTM 1876 using a Zwick Z050 tensile tester (commercially available by Zwick GmbH & Co. KG, Ulm, Germany). The cross head speed is set for all measurements to 100 mm/min and adhesive peel strength measured at 23° C.+/−2° C. and a relative humidity of 50+/−5%. For test assembly preparation a masking tape (Scotch™ 2610 Masking Tape, commercially available from 3M, USA) is applied to a first steel strip. Hereby the masking tape is applied to visualize the bond area. The bond area has a dimension of 100 mm×25 mm. The example material to be tested is then applied to the marked bond area and covered by a second steel strip having the same dimension as the first one. The two strips are hereafter first manually pressed together and then clamped together using 2 binder clips along the bond line, in order to hold the test assembly in place. The test assemblies are cured for with a minimum baking cycle of 20 min at 160° C. and a maximum bake cycle of 45 min at 200° C. in an air circulating oven. Hereby the test assemblies are heated up and cooled down using 3° C./minute ramps. Test assemblies are then conditioned for 24 hours at ambient condition 23+/−2° C. and 50+/−5% relative humidity before testing. Per example material, 3 adhesive peel strength test assemblies are prepared and the test results averaged. Test results are reported in N/25 mm.
Cataplasma Test:

Test specimen as described above for the overlap shear tests were prepared and wrapped in water-soaked cotton wool and then sealed air-tight in a polyethylene bag. These samples were then stored for seven days at 70° C. and 100% relative humidity. After being unwrapped, the test specimen were stored for two hours at 23° C., followed by 2 hours at −28° C. After subsequent reconditioning under standard climate, the overlap shear testing is carried out as described above. The tests results were the compared to the initial standard samples which had not been subjected to the cataplasma conditions as described herein.

Materials:

| Material | Function | Description |
| --- | --- | --- |
| Epikote 828 | Epoxy resin | Trade designation of a liquid reaction product of epichlorohydrin and bisphenol A having an approximate epoxy equivalent weight of 184-190 grams/equivalent. Commercially available by Momentive. |
| Epon 828 | Epoxy resin | Trade designation of a solid reaction product of epichlorohydrin and bisphenol A having an approximate epoxy equivalent weight of 185-192 grams/equivalent according to ASTM D 1652. Commercially available by Resolution Performance Products. |
| D.E.R 671 | Epoxy resin | Trade designation of a solid reaction product of epichlorohydrin and bisphenol A having an approximate epoxy equivalent weight of 475-550 grams/equivalent according to ASTM D 1652. Commercially available by Dow Chemical Co. |
| Epilox A50-02 | Epoxy resin | Trade designation of a solid reaction product of epichlorohydrin and bisphenol A having an approximate epoxy equivalent weight of 450-500 grams/equivalent according to ASTM D 1652. Commercially available by Leuna Harze. |
| Thioplast EPS 350 | Epoxy resin | Trade designation of an epoxydized polysulfide having an approximate epoxy equivalent weight of 250 grams/equivalent according to ASTM D 1652. Commercially available by Akros Chemicals. |
| PK-HP 200 | Thermoplastic resin | Trade designation of a phenoxy resin. Commercially available by InChem Corporation. |
| PK-HH | Thermoplastic resin | Trade designation of a phenoxy resin. Commercially available by InChem Corporation. |
| Epodil 757 | Flexibilizing and wetting agent | Trade designation of a glycidyl ether of cyclohexane dimethanol. Commercially available by Air Products and Chemicals, Inc. |
| Paraloid 2650J | Thoughening agent | Trade designation of a core-shell toughening agent based on butadiene rubber. Commercially available by Dow. |
| Amicure CG1200 | Primary Curative | Trade designation of 2-cyanoguanidine (dicyandiamide), available from Air Products. |
| Omicure U52M | Curative accelerator | Trade designation of 4,4 methylene bisphenyl dimethyl urea, available from CVC Speciality Chemicals, USA. |
| Epodil 757 | Reactive diluent | Trade designation of a glycidyl ester, available from Air Products. |
| Araldite PY 4122 | Reactive diluent | Trade designation of a bisphenol A type epoxy resin, available from Huntsman Corp. |
| Cardolite Ultra LITE 513 | Reactive diluent | Trade designation of a glycidyl ether, available from Cardolite Corp. |
| Micropearl F48D | Physical blowing agent | Trade designation of a thermoexpandable microcapsule produced by encapsulating volatile hydrocarbon with acrylic copolymer. Commercially available by Pierce & Stevens Chemical Corp. |
| MinSil 20 | Fused Silica | Trade designation of fused silica commercially available by Minco, Inc., USA |
| Aerosil R202 | Silica filler/ hydrophobizing agent | Trade designation of a fumed silica aftertreated with a polydimethysiloxane, available commercially by Degussa AG, Germany. |
| Eurocell 140 | Particulate filler | Trade designation of expanded perlite, commercially available by Europerl, Germany. |
| CaO WFK super 40 | Filler absorbing water | Weissfeinkalk Omya |
| Glasperlen | Particulate spacer | Trade designation of glass beads (average grain size 90□m), commercially available by Kominex Mineralmahlwerk, GmbH. |

Preparation of Examples 1-2 and Comparative Example C-1

The epoxy-based compositions of the present disclosure are prepared by combining the ingredients from the list of materials of table 1 in a high speed mixer (DAC 150 FVZ Speedmixer, from Hauschild Engineering) stirring at 3000 rpm. In Table 2, all concentrations are given as wt.-%.

In a first step the epoxy resin, the thermoplastic phenoxy resin and the core shell toughening agent are mixed together for 2 min, thereby yielding a masterbatch formulation with ratios as set forth in table 2. This masterbatch is then placed into an air-driven oven at temperature of 95° C. for about 1 h. The hot mixture is again stirred for 2 min at 3000 rpm in the speed mixer to ensure complete dispersion of the three ingredients. Then the mixer temperature is reduced to 60° C. and the two curatives together with the further ingredients as set forth in table 3 are added to the mixture, followed by mixing for an additional 2 minutes under vacuum. The resulted mixture is a paste having a uniform consistency. By using a knife coater the mixer is hot coated to a film having thickness of 0.4 mm. The formed film is soft and homogenous when cooled down.

TABLE 2

Composition of Masterbatch (MB).

| Raw Materials | wt.-% |
|---|---|
| Epon 828 | 57.94 |
| Phenoxy Resin | 27.68 |
| Paraloid 2650 | 14.38 |
| Total | 100.00 |

TABLE 3

Composition of Examples and Comparative Examples. Ratios are given in wt.-%.

| | Comp. Ex. 1 | Ex. 1 | Ex. 2 | Ex. 3 | Ex. 4 |
|---|---|---|---|---|---|
| Masterbatch (MB) | 68.14 | 66.23 | 68.61 | 68.61 | 68.61 |
| Thioplast EPS 350 | 22.12 | | | | |
| Glass beads | 1.33 | 0.99 | | | |
| Amicure CG 1200 | 2.65 | 1.99 | 2.06 | 2.06 | 2.06 |
| Omicure U52M | 1.33 | 0.99 | 1.03 | 1.03 | 1.03 |
| Epodil 757 | | 1.66 | 1.72 | 1.72 | 1.72 |
| Cardura E10P | 4.42 | 3.31 | 3.43 | 0.00 | 0 |
| Araldite PY 4122 | | | | 3.43 | 0 |
| CardoliteUltra lite 513 | | | | | 3.43 |
| Fused Silica | | 24.83 | 17.15 | 17.15 | 17.15 |
| Calcium oxide | | | 4.29 | 4.29 | 4.29 |
| Graphite flakes | | | 1.72 | 1.72 | 1.72 |
| Total | 100 | 100 | 100 | 100 | 100 |

TABLE 4

Overlap Shear Strength (OLS) and Failure Mode of Example 2.

| | OLS [MPa] | Failure Mode |
|---|---|---|
| OLS at −40° C. | | |
| Min. Bake | 21.87 | Cohesive |
| Max. Bake | 22.23 | Cohesive |
| OLS at 23° C. | | |
| Min. Bake | 18.00 | Cohesive |
| Max. Bake | 17.70 | Cohesive |
| OLS at 80° C. | | |
| Min. Bake | 11.90 | Cohesive |
| Max. Bake | 14.27 | Cohesive |

TABLE 5

T-peel and failure mode of Example 2.

| | T-peel [N/25 mm] | Failure Mode |
|---|---|---|
| at −40° C. | | |
| Min. Bake | 175.00 | Cohesive |
| Max. Bake | 221.00 | Cohesive |
| at 23° C. | | |
| Min. Bake | 172.33 | Cohesive |
| Max. Bake | 183.00 | Cohesive |
| at 80° C. | | |
| Min. Bake | 11.90 | Cohesive |
| Max. Bake | 14.27 | Cohesive |

TABLE 6

Overlap Shear Strenght (OLS) at 23° C. Values are given in MPa.

| | Ex. 3 | Ex. 4 | Comp. Ex. 1 |
|---|---|---|---|
| Min. Bake | 21.8 | 21.0 | 14.5 |
| Max. Bake | 23.7 | 22.0 | 13.0 |

TABLE 7

T-peel at 23° C. Values are given in N/25 mm.

| | Ex. 3 | Ex. 4 | Comp. Ex. 1 |
|---|---|---|---|
| Min. Bake | 180 | 175 | 130 |
| Max. Bake | 188 | 180 | 160 |

TABLE 8

Overlap shear strength result of HD-HD Steel bonds after before and after cataplasma test. The drop of overlap shear strength is given in percent (%).

| | Comp. Ex. 1 Initial (Min) | Comp. Ex. 1 Aged (Min) | Comp. Ex. 1 Initial (Max) | Comp. Ex. 1 Aged (Max) | Ex. 3 Initial (Min) | Ex. 3 aged (Min) | Ex. 3 Initial (Max) | Ex. 3 aged (Max) | Ex. 4 initial (Max) | Ex. 4 aged (Max) |
|---|---|---|---|---|---|---|---|---|---|---|
| OLS [MPa] | 17.71 | 11.22 | 16.39 | 10.59 | 21.88 | 18.62 | 23.68 | 21.57 | 23.75 | 21.13 |
| Strength Drop [%] | | 40.00 | | 40.00 | | 14.88 | | 8.93 | | 11.01 |

TABLE 9

Overlap shear strength result of ELO-HD Steel bonds after before and after cataplasma test. The drop of overlap shear strength is given in percent (%).

| | Ex. 3 Initial (Min) | Ex. 3 aged (Min) | Ex. 3 Initial (Max) | Ex. 3 aged (Max) | Ex. 4 Initial (Min) | Ex. 4 aged (Min) | Ex. 4 initial (Max) | Ex. 4 aged (Max) | Ex. 1 initial (Max) | Ex. 1 aged (Max) |
|---|---|---|---|---|---|---|---|---|---|---|
| OLS [MPa] | 19.21 | 14.48 | 19.15 | 16.92 | 19.05 | 14.17 | 19.06 | 16.24 | 23.75 | 21.13 |
| Strength Drop [%] | | 24.63 | | 11.62 | | 14.88 | | 14.80 | | 11.01 |

The invention claimed is:

1. A method for bonding parts, the method comprising:
   i. Providing a first part and a second part;
   ii. Providing a thermosettable structural adhesive composition to at least one surface of the first part and/or the second part, with the structural adhesive composition comprising:
      (a) an epoxy compound;
      (b) a thermoplastic compound;
      (c) an epoxy curing agent that does not act as a catalyst;
      (d) at least one mineral filler, wherein the at least one mineral filler is capable of absorbing water and is selected from the group consisting of metal oxides and metal hydroxides; and
      (e) at least one component comprising at least one epoxy moiety and at least one linear or branched alkyl group, wherein component (e) is different from (a) the epoxy compound;
   iii. Adhering together the first part and the second part using the structural adhesive composition at a temperature lower than the activation temperature of the epoxy curing agent, thereby forming a joint between the first and the second part, and
   iv. Heating the joint at a temperature higher than the activation temperature of the epoxy curing agent, so as to cause thermosetting of the thermosettable composition.

2. The method according to claim 1, wherein the at least one mineral filler (d) is capable of chemically reacting with water.

3. The method according to claim 1, wherein the composition comprises the at least one component (e) in an amount of from 0.1 to 20 wt. % relative to the total weight of the composition.

4. The method according to claim 1, wherein the composition comprises the at least one mineral filler (d) in an amount of from 0.5 to 50 wt. % relative to the total weight of the composition.

5. The method according to claim 1, wherein the at least one component (e) is a compound according to formula (I)

wherein
R$^1$ is linear or branched alkyl,
R$^2$ is an epoxy moiety
A, B, C are different or the same and are linear or branched alkyl, alkoxy, alkene, alkyne, phenyl, phenoxy, carboxy and are optionally substituted with linear or branched alkyl, alkoxy, alkene, alkine, phenyl, phenoxy and carboxy;
n is 1, 2, or 2;
m is 1, 2, or 3.

6. The method according to claim 5, wherein the at least one component (e) is a glycidyl ether.

7. The method according to claim 1, which provides an overlap shear strength according to DIN EN 1465 of at least 21 MPa at −40° C. and/or of at least 17 MPa at 23° C. and/or at least 11 MPa at 80° C.

8. The method according to claim 1, which provides a T-peel strength according to ASTM D1876 of at least 165 N.

9. The method according to claim 1, which provides a drop of overlap shear strength according to DIN EN 1465 after cataplasma conditions of 30% or less.

10. The method according to claim 1, wherein the mineral filler (d) is selected from the group consisting of MgO, CaO, BaO, K$_2$O, Li$_2$O, Na$_2$O, SrO, and mixtures thereof.

11. The method according to claim 10, wherein the composition comprises the at least one component (e) in an amount of from 0.1 to 20 wt.-% relative to the total weight of the composition.

12. The method according to claim 11, wherein the composition comprises the at least one mineral filler (d) in an amount of from 0.5 to 50 wt.-% relative to the total weight of the composition.

13. The method according to claim 12, which provides a T-peel strength according to ASTM D1876 of at least 165 N.

14. The method according to claim 13, which provides a drop of overlap shear strength according to DIN EN 1465 after cataplasma conditions of 30% or less.

15. The method according to claim 1, wherein the epoxy curing agent is a latent curing agent.

16. The method according to claim 1, wherein the epoxy curing agent is selected from the group of compounds consisting of aliphatic amines, aromatic tertiary amines, boron complexes, imidazoles, guanidines, dicyanodiamide, substituted ureas, acid anhydrides, polyamines, mercaptans, phenols, encapsulated amines and mixtures thereof.

17. The method according to claim 1, wherein the epoxy curing agent is selected from the group consisting of amines, acid anhydrides, guanidines, dicyandiamide, substituted ureas and mixtures thereof.

* * * * *